United States Patent [19]

Sanada et al.

[11] 4,091,411
[45] May 23, 1978

[54] COLOR HUE CONTROL CIRCUIT FOR COLOR TELEVISION RECEIVER

[75] Inventors: Seiji Sanada, Yokosuka; Katsuo Isono, Kawagoe, both of Japan

[73] Assignee: Sony Corporation, Tokyo, Japan

[21] Appl. No.: 785,945

[22] Filed: Apr. 8, 1977

[30] Foreign Application Priority Data

Apr. 12, 1976 Japan .................................. 51-41085

[51] Int. Cl.$^2$ ............................................. H04N 9/535
[52] U.S. Cl. ...................................................... 358/28
[58] Field of Search .............................. 358/10, 28, 19

[56] References Cited

U.S. PATENT DOCUMENTS

| | | | |
|---|---|---|---|
| 2,854,505 | 9/1958 | Davis | 358/10 |
| 3,679,816 | 7/1972 | Avins et al. | 358/19 |
| 3,763,310 | 10/1973 | Sagishima et al. | 358/10 |
| 3,780,218 | 12/1973 | Rennick | 358/28 |

*Primary Examiner*—John C. Martin
*Attorney, Agent, or Firm*—Lewis H. Eslinger; Alvin Sinderbrand

[57] ABSTRACT

A color television receiver having a color picture tube with a screen for displaying a color picture in response to the reception of a composite color television signal which includes a phase reference signal, such as, the chrominance reference portion of a VIR signal, is provided with a circuit for generating variable reference color signals and for causing the color picture tube to display, on at least a portion of its screen, areas of respective colors corresponding to the variable reference color signals, a demodulating circuit for demodulating the phase reference signal and the chrominance component of the color television signal for obtaining demodulated color signals from such chrominance component, a hue correction circuit responsive to the demodulated phase reference signal for correcting errors in the hue of the color picture displayed on the screen in correspondence to the demodulated color signals due to phase distortions in the chrominance component of the received color television signal, and a manually actuable hue adjuster for simultaneously and correspondingly varying the relation of the demodulated color signals to each other and the relation of the variable reference color signals to each other so that the hue of the areas of colors displayed on said screen will correspond to the hue of the color picture displayed on the screen. The color television receiver is further provided with a circuit for generating fixed standard color signals having a relation to each other representing a predetermined standard hue, and for causing the color picture tube to display, on a second portion of its screen adjacent the first mentioned portion of the screen, areas of primary colors corresponding to the standard color signals so that the relation of the hue of the displayed color picture to the standard hue can be readily determined by visual comparison of the areas of colors on the first portion of the screen with the respective areas of primary colors on the adjacent second portion of the screen.

17 Claims, 11 Drawing Figures

COLOR HUE CONTROL CIRCUIT FOR COLOR TELEVISION RECEIVER

BACKGROUND OF THE INVENTION

1. Field of the Invention

This invention relates generally to a color television receiver, and more particularly is directed to an improved color hue control circuit therefor.

2. Description of the Prior Art

Recently, it has been proposed to provide a color television receiver with a color hue control circuit which causes the color picture tube to display a standard color bar, for example, made up of horizontally successive areas of primary colors, such as, red, green and blue, representing a predetermined standard hue, and further causing the color picture tube to display a reference color bar at a location on the screen adjacent the standard color bar and which is similarly composed of horizontally successive areas of red, green and blue colors which are varied in accordance with manual adjustment of the hue of the color picture otherwise reproduced on the screen. With the foregoing arrangement, when the hue of the color picture reproduced or displayed on the screen corresponds to the predetermined standard hue, the colors of the red, green and blue areas of the reference color bar exactly correspond with the red, green and blue areas, respectively, of the adjacent standard color bar so that the attainment of the standard hue can be easily and accurately ascertained merely by a direct visual comparison of the respective areas of the standard and reference color bars. Similarly, deviation of the hue of the color picture being reproduced on the screen from the predetermined standard hue is easily ascertained by a visual comparison of the respective colored areas of the standard and reference color bars, and the viewer can then manually actuate the hue adjustment knob or control of the television receiver until the respective colored areas of the standard and reference color bars become identical. Prior to the described arrangement providing comparable standard and reference color bars on the screen of the color picture tube, it had been the usual practice to determine the suitablity of the hue of the displayed color picture by observing areas of the reproduced color picture representing human skin, and to manually effect the hue adjustment necessary to provide such areas of the reproduced color picture with life-like skin tones. In the event that the displayed color picture did not include areas representing human skin, considerable difficulty was experienced in achieving suitable adjustment of the hue. On the other hand, when comparable standard and reference color bars are provided on the screen of the color picture tube, as aforesaid, accurate adjustment of the hue of the reproduced color picture can be easily effected even when the reproduced color picture does not contain any areas representing human skin.

As is well known, in a conventional NTSC composite color television signal, monochrome information, that is, the brightness information in respect to the video picture, is transmitted by a luminance component, and color information is transmitted by a chrominance component which is constituted by a plurality of color signals amplitude modulated on different phases of a subcarrier. The composite color television signal also includes periodic horizontal and vertical synchronizing signals and color burst signals which are used, in the television receiver, to control a local oscillator so that the local oscillation signal produced by the latter will have its frequency and phase synchronized with the frequency and phase of the color burst signal. Such local oscillation signal is then employed in a demodulator, for example, constituted by synchronous detectors, for demodulating or detecting the color signals of the received chrominance component which are suitably applied to the color picture tube for establishing the color values of the reproduced picture. If the composite color television signal, as received, exactly corresponds to the originally produced color television signal, then the above described color hue control circuit will provide the reproduced color picture with the predetermined standard hue whenever the respective areas of the standard and reference color bars are seen to be of exactly the same colors. However, a transmitted composite color television signal may be subjected to various phase and/or amplitude distortions either at the transmitting site or along the transmitting path. Although the purpose of the color burst signal is to permit the local oscillator of the color television receiver to be controlled so that its output will match or track such distortions, the color burst signal and the color-modulated subcarrier are provided at different levels of the transmitted signal and, thus, may be subjected to different distortions. Consequently, even though the local oscillation signal is phase synchronized with the color burst signal, there may nevertheless be a phase distortion of the color-modulated subcarrier in respect to the local oscillation signal used for demodulating the color signals with the result that errors may appear in the hue of the color picture displayed on the screen even though a visual comparison of the previously mentioned standard and reference color bars would indicate that the displayed or reproduced color picture has the predetermined standard hue. In such case, the viewer must again adjust the color hue with reference to the reproduced color picture, and preferably with reference to areas of such picture representing human skin, rather than by a comparison of the standard and reference color bars. Furthermore, since the phase distortion of the color subcarrier may vary with time, it becomes necessary to repeatedly adjust the hue of the reproduced color picture.

Various proposals have been offered for using a further reference included in the transmitted composite color television signal to minimize the effect of those distortions in the color subcarrier which may not be fully corrected by synchronizing the local oscillator of the color television receiver with the received burst signal. Such further reference signal is known as the vertical interval reference signal, or VIR signal, and includes a chrominance reference portion or bar equal in frequency and phase to the burst signal, and being transmitted during a selected portion, for example, the 19th or 20th horizontal line interval, of the vertical retrace interval. The chrominance reference portion or bar of the VIR signal differs from the burst signal only in that it exists for a longer duration and is superimposed on a level approximating that of the color subcarrier so as to be subject to phase distortions equivalent to those of the color subcarrier.

In one existing circuit arrangement for controlling color hue on the basis of the VIR signal, for example, as disclosed in U.S. Pat. No. 3,755,617, the local oscillator of the television receiver is controlled so that its output or local oscillation signal is synchronized with the received burst signal, the chrominance reference portion or bar of the received VIR signal is phase detected by means of the burst signal to produce a compensation signal representing the phase difference between the chrominance reference portion of the VIR signal and the burst signal, and the phase of the local oscillation signal is shifted or compensated in dependence on the compensation signal so that, when the local oscillation signal is thereafter used for demodulating the color signals, the resulting reproduced or displayed color picture will exhibit the optimum or standard color characteristics. Although the foregoing arrangement is effective to automatically maintain an optimum or standard hue of the reproduced color picture, a television viewer may have a subjective preference for a color picture with a hue other than the optimum or standard hue, and no provision has been made for adjustment of the color hue from the optimum or standard hue.

In another existing circuit arrangement utilizing the transmitted VIR signal, for example, as disclosed in U.S. Pat. No. 3,780,218, a differential amplifier is made operative during the occurrence of the chrominance reference portion or bar of the VIR signal and the R-Y output of the color demodulator is applied to one input of the differential amplifier, while a fixedly predetermined reference voltage is applied to another input of the differential amplifier so that a phase distortion of the chrominance reference portion, and hence of the color subcarrier, will be evidence by a difference between the voltages at two outputs of the differential amplifier. In one embodiment of the arrangement being described, a meter is connected between the outputs of the differential amplifier so as to be deflected from its zero or null position whenever the hue of the reproduced or displayed color picture deviates from the optimum or standard hue, and a manually actuable hue control is associated with the reference or local oscillator so that the phase of the output of the latter can be adjusted for returning the meter indication to its null or zero postion indicating attainment of the optimum or standard color hue. In such embodiment of the known circuit arrangement, the VIR signal is only employed as a reference for indicating, by way of the meter, when the optimum or standard hue has been attained in response to manual actuation of the hue control, and no provision is made for automatic maintenance of the optimum or standard hue.

In another embodiment of the circuit arrangement disclosed in U.S. Pat. No. 3,780,218, the outputs of the differential amplifier are applied to a phase control or variable phase shifter acting on the output of the reference or local oscillator so as to automatically maintain the optimum or standard hue of the displayed color picture. With such automatic circuit arrangement, there is no possibility of the viewer establishing a subjectively preferred hue differing from the optimum or standard hue.

OBJECTS AND SUMMARY OF THE INVENTION

Accordingly, it is an object of this invention to provide a color television receiver with an improved color hue control circuit which permits the viewer to selectively and accurately establish any desired hue of the reproduced color picture, and which thereafter automatically maintains the selected hue in spite of phase distortions in the color subcarrier.

More particularly, it is an object of this invention to provide a color television receiver with a color hue control circuit which permits the viewer to selectively establish any desired hue of the reproduced or displayed color picture as indicated by a reference color bar displayed on the screen of the color picture tube, and which automatically maintains the selected hue be means of a phase reference signal, for example, the chrominance reference portion of a VIR signal included in the transmitted color television signal, even though the color subcarrier of the received color television signal may be subjected to varying phase distortions.

Another object is to provide a color hue control circuit for a color television receiver, as aforesaid, in which the color picture tube is further made to display a standard color bar adjacent the reference color bar and which represents a predetermined optimum or standard color hue for ready visual comparison with the adjustably selected color hue represented by the reference color bar and which is automatically maintained by the hue control circuit.

In accordance with an aspect of this invention, a color hue control circuit for a color television receiver comprises means for generating variable reference color signals, means for causing the color picture tube of the television receiver to display, on at least a portion of the screen thereof, a reference color bar composed of areas of respective colors corresponding to the variable reference color signals, a demodulating circuit for demodulating a phase reference signal, for example, the chrominance reference portion of a VIR signal, and also for demodulating the chrominance component of the received composite color television signal so as to obtain demodulated color signals from the latter, means responsive to the demodulated phase reference signal for correcting errors in the hue of the color picture displayed on the screen due to phase distortions in the chrominance component of the received color television signal, and manually actuable hue adjusting means for simultaneously and correspondingly varying the relation of the demodulated color signals to each other and the relation of the variable reference color signals to each other so that the colors of the reference color bar displayed on the screen will represent a hue corresponding to the hue of the color picture displayed on the screen.

It is a further feature of this invention to provide a color hue control circuit, as aforesaid, with means for generating fixed standard color signals having a relation to each other representing a predetermined optimum or standard hue, and with means for causing the color picture tube to display, on a portion of the screen adjacent to the previously mentioned reference color bar, a standard color bar composed of areas of primary colors corresponding to the standard color signals so that the relation of the adjustably selected hue of the displayed color picture to the standard hue can be readily determined by visual comparison of the respectively colored areas of the reference and standard color bars.

The above and other objects, features and advantages of the invention, will be apparent in the following detailed description of illustrative embodiments which is to be read in connection with the accompanying drawings.

DETAILED DESCRIPTION OF THE PREFERRED EMBODIMENTS

Figure 2:
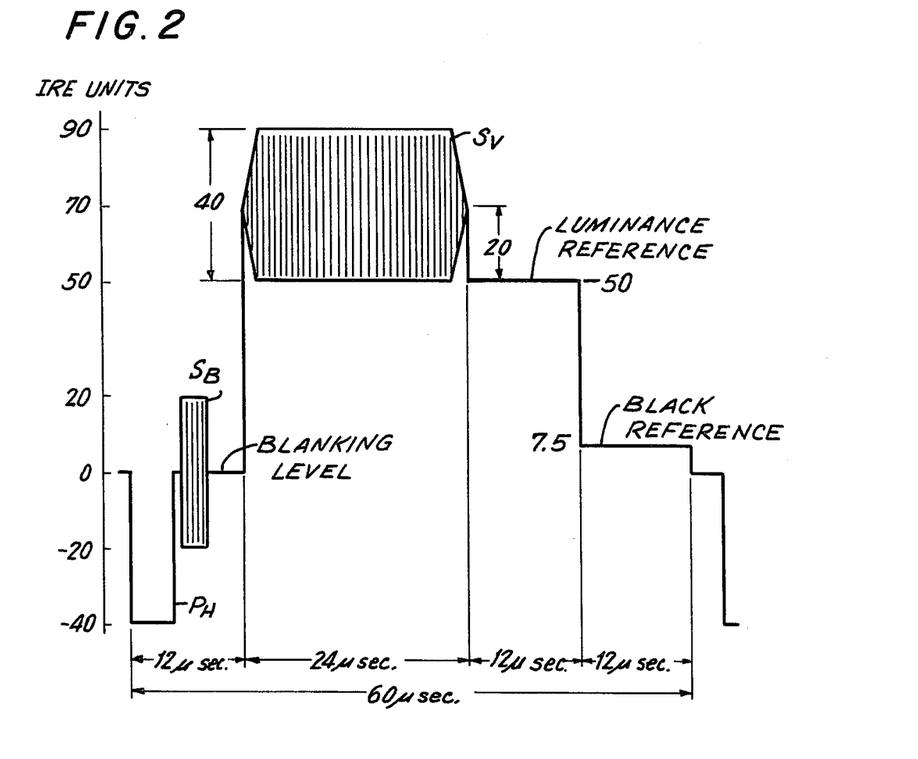
FIG. 2 is a graphic representation of a typical VIR signal included in a transmitted composite color television signal, and by means of which a color hue control circuit according to this invention may automatically maintain an adjustably selected color hue of the reproduced picture.

Before describing a color hue control circuit according to this invention, reference will be made to FIG. 2 for its showing of a VIR signal which may be included in the transmitted composite color television signal under present day NTSC standards. The VIR signal is transmitted in a predetermined line interval, for example, the 19th or 20th line interval, of each vertical retrace interval of the composite color television signal. As shown on FIG. 2, the line interval during which the VIR signal is transmitted includes the normal blanking signal or level and horizontal synchronizing signal $P_H$ as well as the color burst signal $S_B$. The levels of the various components shown on FIG. 2 are expressed in IRE units which are chosen so that the magnitude between the blanking level and the zero carrier is 100 units. As shown, the horizontal synchronizing signal $P_H$ appears as a negative pulse having an amplitude of −40 IRE units, and such pulse is followed by the color burst signal $S_B$ provided on the blanking or pedestal level of zero IRE units. As is conventional, the color burst signal $S_B$ is a sinusoidal signal having a frequency equal to the subcarrier frequency of 3.58 MHz. Typically, the burst signal $S_B$ is present for approximately 8 cycles and has a peak-to-pea, amplitude of 40 IRE units, with the phase of the burst signal $S_B$ being coincident with the −(B—Y) axis. The VIR signal includes a chrominance reference portion or bar $S_V$ which commences approximately 12 microseconds after the beginning of the VIR signal, and which has the same phase as the burst signal $S_B$, that is, the phase of the chrominance reference portion is coincident with the −(B—Y) axis. The chrominance reference portion or bar $S_V$ is formed of the unmodulated subcarrier frequency 3.58 MHz with a peak-to-peak amplitude of 40 IRE units provided on a level of 70 IRE units and exists for a duration of approximately 24 microseconds. Following the chrominance reference portion $S_V$, there are a luminance reference level of 50 IRE units for a duration of 12 microseconds followed, in turn, by a black reference level having a level of 7.5 IRE units and extending for 12 microseconds. The approximate time from the start of the horizontal synchronizing signal $P_H$ to the termination of the black reference level is 60 microseconds. It will be apparent that, when a composite color television signal is provided with a VIR signal as described with reference to FIG. 2, phase distortion of the color modulated subcarrier will be accompanied by an equivalent phase distortion of the chrominance reference portion or bar $S_V$ so that the phase distortion of the chrominance reference portion $S_V$ can be detected and employed as a basis for correcting errors in the hue of the reproduced color picture that would otherwise result from the phase distortion of the color subcarrier.

Figure 3:
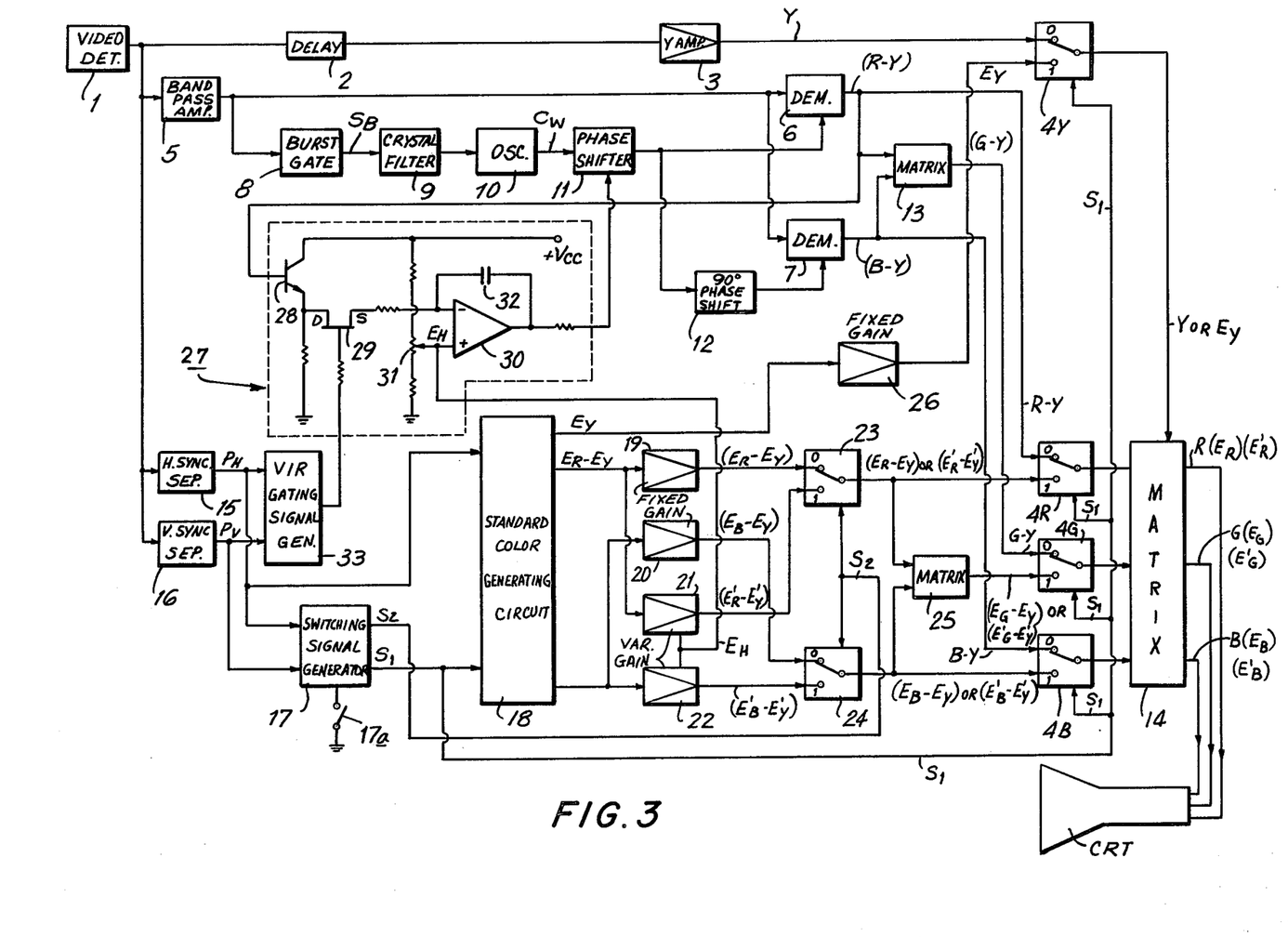
FIG. 3 is a block diagram showing a color hue control circuit according to an embodiment of this invention.

Referring now to FIG. 3, it will be seen that, in a color television receiver according to an embodiment of this invention, a video detector 1 receives a transmitted composite color television signal for obtaining therefrom a composite color video signal containing the luminance and chrominance components. The luminance component Y of the received composite color television signal is supplied from video detector 1 through a luminance channel including a delay circuit 2 and a luminance amplifier 3 to one input "0" of a switching circuit 4Y. The output of video detector 1 is also applied to a band pass filter 5 for separating therefrom the chrominance component which is supplied to color demodulators 6 and 7 which may be, for example, in the form of synchronous detectors.

The burst signal $S_B$ is gated from the chrominance component by means of a burst gate 8 and supplied through a crystal filter 9 having a high Q to a local oscillator 10 which provides a local oscillation signal $C_W$ having its phase synchronized with the phase of burst signal $S_B$. The local oscillation signal $C_W$ is applied to demodulator 6 through a phase shifter 11 which nominally delays the phase thereof by 90° so as to provide a demodulating or detecting signal substantially on the (R-Y) axis. The output of phase shifter 11 is further phase delayed by 90° in a phase shifter 12 to provide a demodulating or detecting signal substantially on the (B-Y) axis and which is applied to the demodulator 7. Thus, demodulators 6 and 7 demodulate color difference signals (R-Y) and (B-Y), respectively, from the chrominance component. Such color difference signals (R-Y) and (B-Y) are applied to a matrix circuit 13 which provides therefrom a color difference signal (G-Y).

The demodulated color difference signals (R-Y), (G-Y) and (B-Y) are applied from demodulator 6, matrix 13 and demodulator 7 to first inputs "0" of switching circuits 4R,4G and 4B, respectively. The outputs of switching circuits 4Y,4R, 4G and 4B are applied to a matrix circuit 14 so that, with such switching circuits in their first or normal states shown on FIG. 3, matrix circuit 14 receives the luminance component Y and the color difference signals (R-Y), (G-Y) and (B-Y) demodulated from the chrominance component to provide therefrom individual color signals R,G and B which are applied to respective cathodes of a color picture tube CRT for causing the latter to display or reproduce a color picture corresponding to the received composite color television signal.

Figure 1:
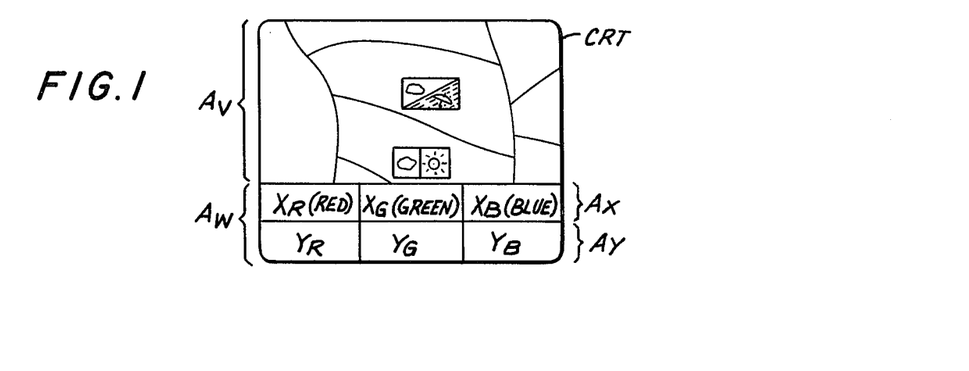
FIG. 1 is a diagrammatic front elevational view of the screen of a color television receiver, and which indicates the manner in which a color picture and standard and reference color bars may be simultaneously displayed on such screen by means of a color hue control circuit according to this invention.
Figure 7:
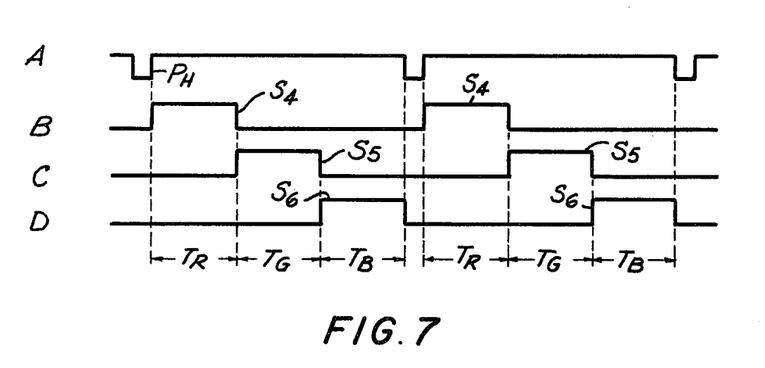
FIG. 7 illustrates waveforms representing additional switch control signals and to which reference will be made in explaining the operation of the color hue control circuit of FIG. 6.

The output of vidio detector 1 is further applied to a horizontal sync separator circuit 15 and a vertical sync separator circuit 16 by which horizontal synchronizing signals $P_H$ (waveform A on FIG. 7) and vertical synchronizing signals $P_V$ (waveform A on FIG. 4) are respectively obtained. The horizontal and vertical synchronizing signals $P_H$ and $P_V$ are applied to a switching signal generating circuit 17 which, in response to such synchronizing signals, produces switch control signals $S_1$ and $S_2$ at respective outputs of generator 17. A normally open switch 17a is connected between switching signal generating circuit 17 and ground so that, when switch 17a is closed for deactivating switching signal generating circuit 17, both outputs from such circuit will remain at "0" levels for permitting the reproduced color picture to be displayed over the entire area of the screen of color picture tube CRT. However, during normal operation of switching signal generating circuit 17, that is, when deactivating switch 17a is open, as shown, switch control signal $S_1$ remains at the level "0" for a major portion $T_V$ (waveform B on FIG. 4) of each vertical interval of the color television signal during which the electron beams of the color picture tube are made to scan a major portion $A_V$ of the area of the screen starting from the top thereof (FIG. 1), and switch control signal $S_1$ is raised to the level "1" for the concluding portion $T_W$ of each vertical interval (waveform B on FIG. 4) during which the electron beams scan the lower portion $A_W$ of the screen (FIG. 1). As is indicated by waveform C on FIG. 4, during normal operation of switching signal generating circuit 17, switch control signal $S_2$ remains at the level "0" for the portion $T_V$ of each vertical interval and also for the first half $T_X$ of the concluding portion $T_W$ of each vertical interval during which the electron beams scan a horizontally extending portion or bar-like area $A_X$ (FIG. 1) on the screen, and the signal $S_2$ is raised to the level "1" only for the last half $T_Y$ of the concluding portion $T_W$ of each vertical interval during which the electron beams scan a horizontally extending portion or bar-like area $A_Y$ immediately below the horizontally extending bar-like area $A_X$ of the screen (FIG. 1).

The horizontal synchronizing signals $P_H$ and the switch control signals $S_1$ are applied to a standard color signal generating circuit 18 which is operative only during the portion $T_W$ of each vertical interval, that is, when the electron beams scan the portion $A_W$ of the screen, to provide signals $E_Y$, $(E_R-E_Y)$ and $E_B-E_Y)$ which represent a predetermined standard or optimum hue for the reproduced color picture.

Figure 5:
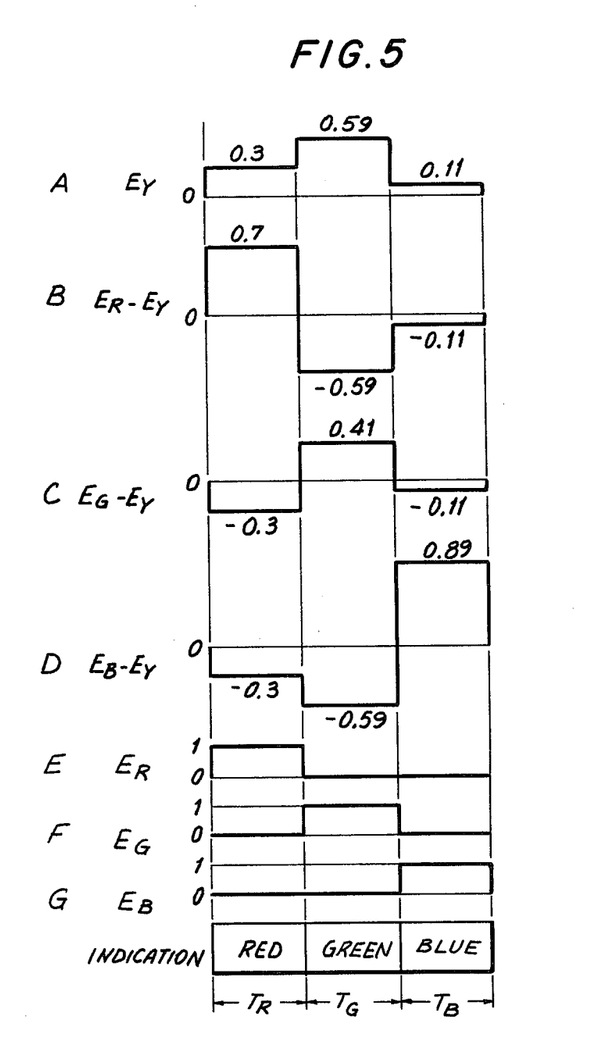
FIG. 5 illustrates waveforms to which reference will be made in explaining how standard color signals are produced in the color hue control circuit of FIG. 3.

As is shown on FIG. 5, each horizontal or line interval during the portion $T_W$ of each vertical interval is divided by circuit 18 into three substantially equal successive periods $T_R, T_G$ and $T_B$, and the signals $E_Y$, $(E_R-E_Y)$ and $(E_B-E_Y)$ produced by standard color generating circuit 18 are provided with respective varying voltage levels during such successive periods $T_R, T_G$ and $T_B$, as indicated by waveforms A, B and D, respectively, on FIG. 5. The signals $(E_R-E_Y)$ and $(E_B-E_Y)$ are applied to fixed gain amplifiers 19 and 20, respectively, and also to variable gain amplifiers 21 and 22, respectively. The variable gain amplifiers 21 and 22 are controlled by a reference signal level or voltage $E_H$ so as to have their respective gains altered in opposite directions in response to changes in such reference signal level $E_H$, as hereinafter described in detail.

As shown in FIG. 3, the outputs of fixed gain amplifiers 19 and 20 are applied to first inputs "0" of switching circuits 23 and 24, respectively, while the outputs of variable gain amplifiers 21 and 22 are applied to second inputs "1" of switching circuits 23 and 24, respectively. The outputs of switching circuits 23 and 24 are applied to a matrix circuit 25 and to inputs "1" of switching circuits 4R and 4B, respectively, while the output of matrix circuit 25 is applied to an input "1" of switching circuit 4G. Further, the signal $E_Y$ from standard color generating circuit 18 is applied through a fixed gain amplifier 26 to an input "1" of switching circuit 4Y.

Figure 4:
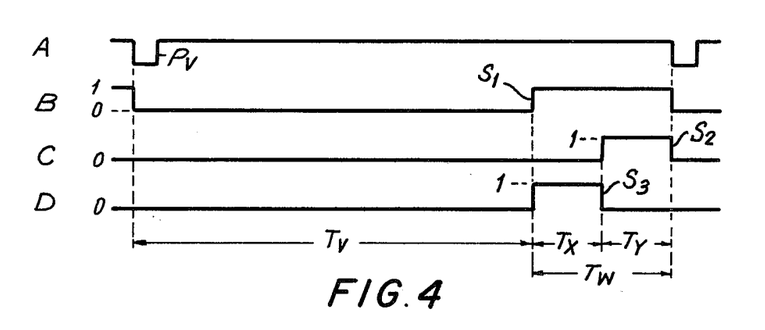
FIG. 4 illustrates waveforms representing respective switch control signals and to which reference will be made in explaining the operation of the color hue control circuit of FIG. 3.

The switching circuits 4,4R,4G and 4B are controlled by the switch control signal $S_1$ so as to remain in their normal or first states illustrated on FIG. 3 so long as switch control signal $S_1$ is at the "0" level, that is, during the portion $T_V$ of each vertical interval, and switching circuits 4Y,4R,4G and 4B are each changed-over to a second state in which the input "1" of the switching circuit is connected to the respective output, during the portion $T_W$ of each vertical interval in which the signal $S_1$ is raised to the level "1" (waveform B on FIG. 4).

The switch control signal $S_2$ controls switching circuits 23 and 24 so that each of switching circuits 23 and 24 remains in its normal or first state shown on FIG. 3, and in which the input "0" of each of the switching circuits 23 and 24 is connected with the respective output, so long as switch control signal $S_2$ is at the "0" level during the portions $T_V$ and $T_X$ of each vertical interval (waveform C on FIG. 4). On the other hand, when switch control signal $S_2$ rises to the level "1" during the concluding portion $T_Y$ of each vertical interval, switching circuits 23 and 24 are each changed-over thereby to a second state in which the input "1" of the switching circuits 23 and 24 are each changed-over thereby to a second state in which the input "1" of the switching circuit is connected to the respective output thereof.

The color hue control circuit in accordance with this invention is further shown on FIG. 3 to include a circuit 27 for maintaining any selected hue of the color picture displayed by the color picture tube even though the color modulated subcarrier of the received composite color television signal has phase distortions that may be different from the phase distortions of the color burst signal. More particularly, the circuit 27 is shown to be in the form of a sample-hold circuit generally comprised of an emitter-follower transistor 28 having its base electrode connected to the output of demodulator 6, a bi-directional switching device 29 shown in the form of a FET, an operational amplifier 30 and a variable resistor 31 which is manually adjustable for determining the value of the reference signal level $E_H$ and thereby effecting hue adjustment, as hereinafter described in detail.

As is shown, the collector of transistor 28 is connected to an operating voltage source $+V_{cc}$, while the emitter of transistor 28 is connected to an inverting input terminal (−) of operational amplifier 30 through the drain-source path of FET 29. The non-inverting or positive input terminal (+) of operational amplifier 30 is connected to the movable tap of variable resistor 31 so as to have the reference signal level $E_H$ applied thereto. The output of operational amplifier provides a phase control signal applied to phase shifter 11 which, in the color hue control circuit according to this invention, is made variable thereby. A storage capacitor 32 is connected as a feedback capacitor from the output of operational amplifier 30 to its inverting input terminal (−). As is conventional, operational amplifier 30 is a high gain amplifier which amplifies the difference between the signals applied to its inverting and non-inverting input terminals. In the illustrated circuit 27, amplifier 30 is connected as a so-called mirror integrating circuit and, as such, the output voltage produced by operational amplifier 30 and applied as a phase control signal to variable phase shifter 11 is linearly related to the input or sampled voltage applied to the base of transistor 28. Since the gain of operational amplifier 30 is high, capacitor 32 can store the voltage sampled by transistor 28 and FET 29 for a relatively long time interval.

As is further shown on FIG. 3, the horizontal and vertical synchronizing signals $P_H$ and $P_B$ are applied to a VIR gating signal generating circuit 33 which, in response to such synchronizing signals, provides a VIR gating pulse or signal only during the 19th, 20th or other horizontal interval of each vertical retrace interval in which the VIR signal is inserted in the received composite color television signal. Such VIR gating pulse or signal is applied to the gate of FET 29 so as to make the latter conductive only during the horizontal interval at which the VIR signal is inserted.

When the VIR gating or sampling signal from generator 33 makes FET 29 conductive, capacitor 32 will be charged to a level corresponding to the level of the demodulated output of demodulator 6 superimposed on a suitable DC bias voltage and which is then applied to the base of transistor 28. The charging time constant is determined by the capacitance of capacitor 32 and the forward resistance of FET 29. If the next-sampled demodulated output from demodulator 6 is less than the previously sampled and stored output from such demodulator, then capacitor 32 will discharge through FET 29 when the latter is rendered conductive by the VIR gating or sampling signal, that is, capacitor 32 will be charged to a lower level than that to which it had been previously charged. Hence, it is desirable that the forward and reverse resistances of FET 29 be equal to each other so as to provide capacitor 32 with equal charging and discharging time constants.

Sample-hold circuit 27 is designed so that, when the movable tap of variable resistor 31 is adjusted so that the voltage or reference signal level $E_H$ is equal to a predetermined standard level or voltage $E_{HO}$ which corresponds to a predetermined optimum or standard hue of the reproduced color picture, the output of operational amplifier 30 controls phase shifter 11 so as to delay the local oscillation signal $C_W$ from oscillator 10 by 90° so long as no phase distortions appear in the color modulated subcarrier of the received composite color television signal.

Figure 9:
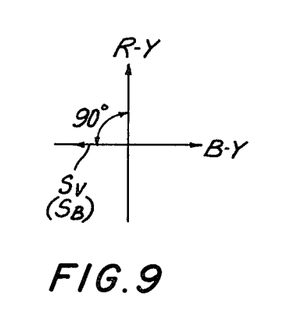
FIGS. 9, 10 and 11 are vector diagrams showing the angular relation of the chrominance reference portions of a VIR signal and the various color-difference outputs of a demodulator in a color television receiver provided with a color hue control circuit according to this invention, and to which reference will be made in explaining the operation of such circuit.

At this point, it will be noted that, if no phase distortion appears in the color modulated subcarrier, the chrominance reference portion $S_V$ of the VIR signal is also free of phase distortion and the phase of the chrominance reference portion $S_V$ coincides with that of the burst signal $S_B$ and, hence, with the phase of the local oscillation signal $C_W$ from oscillator 10, as shown on FIG. 9. Therefore, if there is no phase distortion and the reference signal level $E_H$ is adjusted to be equal to $E_{HO}$ so that the output of sample-hold circuit 27 causes phase shifter 11 to delay the phase of local oscillation signal $C_W$ by precisely 90°, then the phase of the demodulating signal on the (R-Y) axis, as applied to demodulator 6, is delayed precisely by 90° in respect to the burst signal $S_B$ and the value of the demodulated VIR signal on the (R-Y) axis becomes zero, that is, the output from demodulator 6 is zero during the horizontal or line interval of the VIR signal. Since there is no demodulated output from demodulator 6 during the interval of the VIR signal when the color modulated subcarrier, and hence the chrominance reference portion of the VIR signal, is free of phase distortion, sample-hold circuit 27 responds to the foregoing so as to continue to cause phase shifter 11 to delay the local oscillation signal $C_W$ by precisely 90°.

Figure 10:
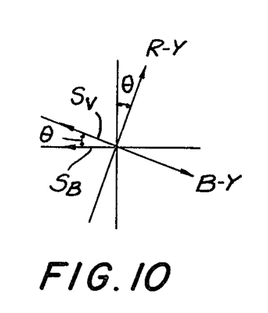
Figure 11:
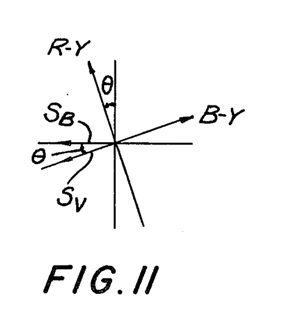

However, if the reference signal level $E_H$ is still adjusted to be equal to the optimum or standard value $E_{HO}$ and the color modulated subcarrier has a phase distortion $\theta$ in the delayed direction, the chrominance reference portion $S_V$ of the VIR signal has the same phase distortion with the result that, during the interval of the VIR signal, a demodulated output is obtained from demodulator 6 for application to the base of transistor 28 and, in response thereto, the output of operational amplifier 30 causes variable phase shifter 11 to delay the local oscillation signal $C_W$ by 90° + $\theta$. When the local oscillation signal delayed by 90° + $\theta$ is applied as a demodulating signal to demodulator 6, the demodulated chrominance reference portion $S_V$ of the VIR signal on the R-Y axis again becomes zero, as shown on FIG. 10, with the result that circuit 27 continues to cause phase shifter 11 to delay the local oscillation signal by 90° + $\theta$. Conversely, if the color modulated subcarrier has a phase distortion of $\theta$ in the gaining direction at a time when reference signal level $E_H$ is adjusted to be equal to the predetermined optimum or standard level $E_{HO}$, the corresponding phase distortion of chrominance reference portion $S_V$ of the VIR signal results in an output from demodulator 6 during the interval of the VIR signal and, in response to such output from demodulator 6, sample-hold circuit causes phase shifter 11 to delay the local oscillation signal $C_W$. When the local oscillation signal delayed by 90° − $\theta$ is applied as the demodulating signal to demodulator 6, the demodulated chrominance reference portion of the VIR signal on the R-Y axis, and hence the output from demodulator 6 during the interval of the VIR signal, becomes zero, as shown on FIG. 11.

It will be apparent from the above that, when the reference signal level $E_H$ is adjusted to be equal to the predetermined optimum or standard level $E_{HO}$, the sample-hold circuit 27 responds to any phase distortion of the color modulated subcarrier, and hence of the chrominance reference portion $S_V$ of the VIR signal, so as to cause phase shifter 11 to suitably adjust the phases of the demodulating signals applied to demodulators 6 and 7 in the sense for ensuring that the demodulated color difference signals (R-Y), (B-Y) and (G-Y) obtained from demodulators 6 and 7 and matrix 13, respectively, will always correspond to the predetermined optimum or standard hue of the color picture to be reproduced therefrom.

As previously noted, the reference signal level $E_H$ obtained at the movable tap of variable resistor 31 is applied to amplifiers 21 and 22 for controlling the gains of the latter. When variable resistor 31 is adjusted so that reference signal level $E_H$ is equal to the predetermined optimum or standard level $E_{HO}$ corresponding to the standard color hue, such reference signal level $E_H$ causes amplifiers 21 and 22 to have respective gains equal to the fixed gains of amplifiers 19 and 20 and, accordingly, outputs ($E'_R$−$E'_Y$) and ($E'_B$−$E'_Y$) from variable gain amplifiers 21 and 22 are respectively equal to the outputs ($E_R-E_Y$) and ($E_B-E_Y$) from fixed gain amplifiers 19 and 20. As a result of the foregoing, outputs ($E'_R-E'_Y$) and ($E'_B-E'_Y$) and the resulting output ($E'_G-E'_Y$) from matrix circuit 25 will represent the same standard or optimum hue as is represented by outputs ($E_R-E_Y$) and ($E_B-E_Y$) and the resulting output ($E_G-E_Y$) from matrix circuit 25.

When the movable tap of variable resistor 31 is adjusted so that the reference signal level $E_H$ is smaller than the standard level $E_{HO}$ corresponding to the predetermined optimum or standard hue, and assuming for the time being that there is no phase distortion of the color modulated subcarrier, the output of operational amplifier 30 causes phase shifter 11 to delay the phase of the local oscillation signal $C_W$ by more than 90° with the result that the demodulated chrominance reference portion $S_V$ of the VIR signal on the R-Y axis is a negative value for suitably reducing the charge on capacitor 32. Thus, when the reference signal level $E_H$ is reduced, the phase control signal from sample-hold circuit 27 causes phase shifter 11 to correspondingly increase the delay of the demodulating signals applied to demodulators 6 and 7 with the result that the demodulated color difference signals (R-Y), (B-Y) and (G-Y) obtained from demodulators 6 and 7 and matrix 13 are suitably adjusted relative to each other to provide the corresponding reproduced color picture with a hue that is more strongly red than in a color picture having the predetermined optimum or standard hue. Further, when the reference signal level $E_H$ is adjusted to be smaller than the predetermined optimum or standard level $E_{HO}$, the gain of amplifier 21 is increased so as to be larger than the gain of amplifier 19, and the gain of amplifier 22 is reduced to be smaller than the gain of amplifier 20. By reason of the foregoing, outputs ($E'_R-E'_Y$) and ($E'_B-E'_Y$) from variable gain amplifiers 21 and 22 and the resulting output ($E'_G-E'_Y$) from matrix circuit 25 are made to represent a hue that is more strongly red than the optimum or standard hue represented by the outputs ($E_R-E_Y$) and ($E_B-E_Y$) of amplifiers 19 and 20 and the resulting output ($E_G-E_Y$) from matrix circuit 25.

Conversely, when the movable tap of variable resistor 31 is adjusted so that reference signal level $E_H$ is made larger than the standard or optimum level $E_{HO}$, and assuming again that the color modulated subcarrier is free of any phase distortion, the phase control signal from circuit 27 causes phase shifter 11 to delay the local oscillation signal $C_W$ by less than 90°. As a result of the corresponding change in the phase of the demodulating signal applied to demodulator 6, the demodulated chrominance reference portion of the VIR signal on the R-Y axis becomes a positive value for increasing the charge on capacitor 32 and stabilizing the phase control signal from operational amplifier 30 at the level where phase shifter 11 delays the local oscillation signal by an angle less than 90° which corresponds to the reduced reference signal level $E_H$. As a result of the foregoing, a color picture reproduced from the color difference signals (R-Y), (B-Y) and (G-Y) obtained from demodulators 6 and 7 and matrix circuit 13 has a hue which is more strongly blue than the predetermined optimum or standard hue. Further, when reference signal level $E_H$ is made larger than the standard or optimum level $E_{HO}$, the gain of amplifier 21 is reduced to be less than that of amplifier 19 and the gain of amplifier 22 is increased to be larger than that of amplifier 20. As a result of the foregoing, the outputs ($E'_R-E'_Y$) and ($E'_B-E'_Y$) of amplifiers 21 and 22 and the resulting output ($E'_G-E'_Y$) of matrix circuit 25 represent a hue which is similarly more strongly blue than the standard or optimum hue represented by the outputs ($E_R-E_Y$) and ($E_B-E_Y$) of amplifiers 19 and 20 and the resulting output ($E_G-E_Y$) of matrix circuit 25.

In either of the above described cases, that is, when reference signal level $E_H$ is adjusted to be smaller or larger than the standard or optimum level $E_{HO}$, phase distortion of the color modulated subcarrier, and hence of chrominance reference portion $S_V$ of the VIR signal, suitably varies the value or level of the demodulated chrominance reference portion of the VIR signal obtained at the output of demodulator 6 and applied to sample-hold circuit 27, and the latter responds thereto for suitably varying the phase control signal applied to phase shifter 11 so that the latter more or less delays the local oscillation signal and thereby causes the color difference signals obtained from demodulator 6 and 7 and matrix 13 to continue to represent the color picture hue corresponding to the adjusted reference signal level $E_H$.

DESCRIPTION OF OPERATION OF THE EMBODIMENT OF FIG. 3

The color hue control circuit according to this invention, as described above with reference to FIG. 3, operates as follows:

During the portion $T_V$ of each vertical interval, switching circuits 4Y, 4R, 4G and 4B and switching circuits 23 and 24 remain in their normal or first states shown on FIG. 3 in response to the "0" levels of switch control signals $S_1$ and $S_2$, respectively. Therefore, during the scanning of the area $A_V$ of the screen of color picture tube CRT by the electron beams, matrix circuit 14 has applied thereto the luminance component Y of the received composite color television signal and the color difference signals (R-Y), (G-Y) and (B-Y) which have been demodulated from the chrominance component of the received composite color television signal. Accordingly, matrix circuit 14 provides individual color signals R, G and B which are applied to respective cathodes of color picture tube CRT so that a color picture corresponding to the received composite color television signal will be displayed at area $A_V$ of the screen. As previously indicated, the hue of the color picture displayed at area $A_V$ of the screen is determined by the selected reference signal level $E_H$ which is dependent upon the manual setting or adjustment of variable resistor 31 by the viewer. Moreover, if reference signal level $E_H$ is adjusted to be equal to the standard level $E_{HO}$, the hue of the color picture displayed at area $A_V$ will be the predetermined optimum or standard hue. On the other hand, if reference signal level $E_H$ is adjusted to be smaller or larger than the standard level $E_{HO}$, then the hue of the color picture displayed at the area $A_V$ will be more strongly red or more strongly blue, respectively, than the predetermined optimum or standard hue. Furthermore, in all cases, that is, whether the reference signal level $F_H$ is adjusted to be equal to, or smaller or larger than the standard level $E_{HO}$, the feedback of demodulated chrominance reference portion $S_V$ of the VIR signal from the output of demodulator 6 to the input of sample-hold circuit 27 and the control of phase shifter 11 by the resulting phase control signal from circuit 27 ensures that the hue of the color picture displayed at area $A_V$ will, at all times, correspond to the adjusted reference signal level $E_H$ even when the color modulated subcarrier of the received composite color television signal is subjected to phase distortions.

At the completion of the portion $T_Y$ of each vertical interval and, thereafter, during the portion $T_X$ of each vertical interval, switch control $S_1$ rises to the level "1" while switch control signal $S_2$ remains at the "0" level. Therefore, during the scanning of the bar-like area $A_X$ of the screen, switching circuits 4Y,4R,4G and 4B are changed-over to their second states in which the input "1" of each of such switching circuits is connected to the respective output, while the switching circuits 23 and 24 remain in their normal or first states shown on FIG. 3. Therefore, during the scanning of bar-like area $A_X$, matrix circuit 14 receives the standard luminance signal $E_Y$ from standard color signal generating circuit 18 by way of amplifier 26 and switching circuit 4Y, while standard color-difference signals $(E_R-E_Y)$ and $(E_B-E_Y)$ are applied to matrix circuit 14 from generating circuit 18 by way of fixed gain amplifier 19 and switching circuits 23 and 4R and by way of fixed gain amplifier 20 and switching circuits 24 and 4B, respectively, and the standard color difference signal $(E_G-E_Y)$ is applied to matrix circuit 14 from matrix circuit 25 by way of switching circuit 4G. As previously described, and as shown particularly by the waveforms A-D on FIG. 5, standard luminance signal $E_Y$ and standard color difference signals $(E_R-E_Y)$, $(E_G-E_Y)$ and $(E_B-E_Y)$ are provided with respective different voltage levels during the successive, substantially equal periods $T_R$, $T_G$ and $T_B$ of each horizontal or line interval during portion $T_X$ of each vertical interval so that matrix circuit 14 will provide individual standard color signals $E_R, E_G$ and $E_B$ during such successive periods $T_R, T_G$ and $T_B$, respectively, as indicated by waveforms E,F and G on FIG. 5.

Since the individual standard color signals $E_R, E_G$ and $E_B$ are applied in a repeating cycle to respective cathodes of color picture tube CRT during successive periods $T_R, T_G$ and $T_B$, respectively, of each horizontal or line interval during portion $T_X$ of each vertical interval, standard red, green and blue colors are displayed in the horizontally successive areas $X_R, X_G$ and $X_B$, respectively, of bar-like area $A_X$ (FIG. 1) for representing the predetermined optimum or standard hue of a color television picture. Although the individual standard color signals $E_R, E_G$ and $E_B$ are represented by waveforms E,F and G, respectively of FIG. 5 as having equal amplitudes, it will be understood that such individual standard color signals may vary in amplitude from each other so as to compensate for the different degrees of electroluminescence of the red, green and blue phosphors provided on the screen of the color picture tube.

At the completion of the portion $T_X$ of each vertical interval, and thereafter during the concluding portion $T_Y$ of each vertical interval, switch control signal $S_1$ continues at its "1" level and switch control signal $S_2$ is raised to its "1" level. Therefore, during the scanning of the bar-like area $A_Y$ of the screen, switches 4Y,4R,4G and 4B remain in the previously described second states thereof, and switching circuits 23 and 24 are changed-over to the second states of the latter in which the input "1" of each such switching circuit is connected to the respective output. By reason of the foregoing, during the scanning of bar-like area $A_Y$, matrix circuit 14 receives the standard luminance signal $E_Y$ from standard color generating circuit 18 by way of amplifier 26 and switching circuit 4Y, while reference color difference signals $(E'_R-E'_Y)$ and $(E'_B-E'_Y)$ are applied to matrix circuit 14 from variable gain amplifiers 21 and 22 by way of switching circuits 23 and 4R and by way of switching circuits 24 and 4B, respectively, and reference color difference signal $(E'_G-E'_Y)$ is applied to matrix circuit 14 from matrix circuit 25 by way of switching circuit 4G. Thus, during scanning of screen area $A_Y$, matrix circuit 14 provides reference color signals $E'_R, E'_G$ and $E'_B$ in a repeating cycle during each horizontal or line interval in correspondence to the luminance signal $E_Y$ and the reference color difference signals $(E'_R-E'_Y),(E'_G-E'_Y)$ and $(E'_B-E'_Y)$ then being applied thereto.

As previously described, the relative values of reference color difference signals $(E'_R-E'_Y)$ and $(E'_B-E'_Y)$ and hence of reference color difference signal $(E'_G-E'_Y)$ derived therefrom, are dependent on the gains of variable gain amplifiers 21 and 22 under the control of reference signal level $E_H$. Thus, the relation to each other of the reference color signals $E'_R, E'_G$ and $E'_B$ applied by matrix circuit 14 to the respective cathodes of the color picture tube during the scanning of bar-like area $A_Y$ of the screen will be determined by the selected reference signal level $E_H$. Since the luminance signal $E_Y$ and the color difference signals $(E_R-E_Y)$ and $(E_B-E_Y)$ applied to variable gain amplifiers 21 and 22 have the different levels shown by waveforms A,B and D, respectively on FIG. 5 during the successive periods $T_R, T_G$ and $T_B$ of each horizontal interval during the portion $T_Y$ of each vertical interval, it will be apparent that the individual reference color signals $E'_R, E'_G$ and $E'_B$ applied from matrix circuit 14 to the respective cathodes of the color picture tube will occur, in a repeating cycle, during the successive periods $T_R, T_G$ and $T_B$, respectively, and, therefore, similarly to the standard color signals $E_R, E_G$ and $E_B$, will cause the color picture tube to display red, green and blue colors in the horizontally successive areas $Y_R, Y_G$ and $Y_B$ of bar-like area $A_Y$ of the screen (FIG. 1).

It will be understood that, when variable resistor 31 is adjusted to provide a reference signal level $E_H$ equal to the standard or optimum level $E_{HO}$, in which case, the gains of amplifiers 21 and 22 are equal to the fixed gains of amplifiers 19 and 20, respectively, the reference color signals $E'_R, E'_G$ and $E'_B$ will be equal to the standard color signals $E_R, E_G$ and $E_B$, respectively. As a result of the foregoing, the colors of the red, green and blue areas $Y_R, Y_G$ and $Y_B$ making up bar-like area $A_Y$ will be identical with the standard red, green and blue colors displayed in the areas $X_R, X_G$ and $X_B$, respectively, making up bar-like area $A_X$ so as to readily indicate to the viewer that the hue of the color picture then being displayed at area $A_Y$ of the screen is the predetermined standard or optimum hue. If the colors appearing in the several areas of bar-like area $A_Y$, which may be referred to as a reference color bar, are different from the standard colors appearing in the respective areas of bar-like area $A_X$, which may be referred to as a standard color bar, the viewer may manipulate variable resistor 31 for changing reference signal level $E_H$ until there is exact correspondence of the respective colors of reference color bar $A_Y$ and standard color bar $A_X$, at which time the hue of the color picture displayed at area $A_Y$ will be the predetermined standard or optimum hue. Therefore, hue adjustment to obtain the standard hue can be readily effected even when the color picture displayed at area $A_Y$ does not include areas depicting human skin to be observed for subjectively determining when a satisfactory hue has been obtained.

Furthermore, if the viewer has a personal preference for a color picture with a hue different from the standard or optimum hue, the same can be realized merely by adjusting variable resistor 31 and, in such case, the colors of areas $Y_R, Y_G$ and $Y_B$ of reference color bar $A_Y$ are suitably altered in respect to the standard colors displayed in the respective areas of standard color bar $A_X$ for readily indicating to the viewer the relation of the actual hue of the color picture displayed at area $A_B$ to the standard or optimum hue. Moreover, it will be apparent that, in the described color hue control circuit according to this invention, the sample-hold circuit 27 functions to maintain the desired hue of the color picture displayed at area $A_V$, as determined by the selected reference signal level $E_H$ and as indicated by a visual comparison of standard and reference color bars $A_X$ and $A_Y$, even when the color modulated subcarrier of the received composite color television signal has phase distortions.

Finally, after a desired hue of the color picture displayed at area $A_V$ has been established by adjustment of variable resistor 31 while visually comparing the standard and reference color bars $A_X$ and $A_Y$, switch 17a associated with the switching signal generating circuit 17 may be closed for continuously maintaining switch control signals $S_1$ and $S_2$ at their "0" levels and thereby causing the display of the color picture with the desired hue over the entire area of the screen of the color picture tube.

A color hue control circuit according to another embodiment of this invention is illustrated on FIG. 6 and components thereof corresponding to those previously described with reference to FIG. 3 are identified by the same reference numerals. Generally, the color hue control circuit of FIG. 6 differs from the previously described embodiment of the invention only in respect to the means employed for producing the standard color signals and the reference color signals which are displayed in respective areas of the standard and reference color bars $A_X$ and $A_Y$, respectively, on the screen of the color picture tube.

Figure 6:
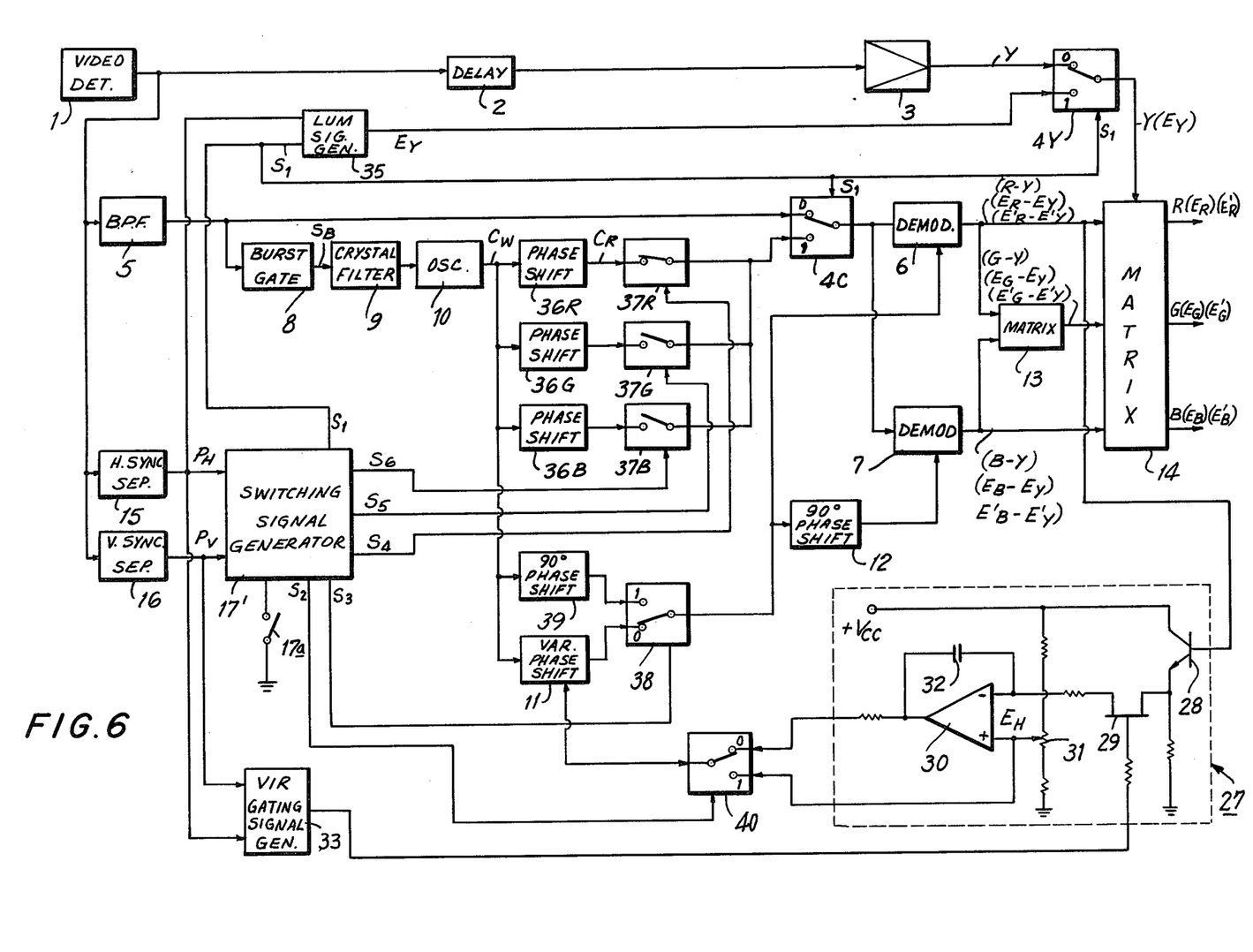
FIG. 6 is a block diagram illustrating a color hue control circuit according to another embodiment of this invention.

More particularly, it will be seen that, in the color hue control circuit of FIG. 6, the horizontal synchronizing signals $P_H$ from horizontal sync separator 15 and the switch control signal $S_1$ from switching signal generating circuit 17' are applied to a luminance signal generating circuit 35 so that the latter will provide a standard luminance signal $E_Y$, as represented by the waveform A on FIG. 5, to input "1" of switching circuit 4Y during portions $T_X$ and $T_Y$ of each vertical interval. As before, switching circuit 4Y is controlled by switch control signal $S_1$ so as to remain in its illustrated normal or first state for supplying luminance component Y to matrix circuit 14 during the portion $T_V$ of each vertical interval, and to be changed-over to its second state by switch control signal $S_1$ during the portions $T_X$ and $T_Y$ of each vertical interval for applying the standard luminance signal $E_Y$ from generating circuit 35 to matrix circuit 14.

In the embodiment of FIG. 6, the outputs of demodulators 6 and 7 and of matrix circuit 13 are directly connected to matrix circuit 14, and a switching circuit 4C, which is also controlled by switch control signal $S_1$, has its output connected to demodulators 6 and 7. A first input "0" of switching circuit 4C is connected to band pass filter 5 for applying the chrominance component of the received composite color television signal to demodulators 6 and 7 when switching circuit 4C is in its illustrated normal or first state. The local oscillation signal $C_W$ provided by local oscillator 10 with the same phase as the burst signal $S_B$ is supplied to phase shifters 36R, 36G and 36B connected in parallel to provide phase shifted signals $C_R, C_G$ and $C_B$, respectively, with phases corresponding to the R-Y, G-Y and B-Y axes, respectively. The phase-shifted signals $C_R, C_G$ and $C_B$ are connected through normally open switching circuits 37R, 37G and 37B, respectively, to a second input "1" of switching circuit 4C. Therefore, when switch control signal $S_1$ is raised to the level "1" during the portions $T_X$ and $T_Y$ of each vertical interval for changing-over switching circuit 4C from its normal or first state shown on FIG. 6 to a second state in which input "1" of switching circuit 4C is connected to the respective output, the phase-shifted signals $C_R, C_G$ and $C_B$ are successively applied to demodulators 6 and 7 in a repeating cycle in response to the successive closing of switching circuits 37R, 37G and 37B, respectively, in a corresponding repeating cycle.

The switching signal generating circuit 17' of the embodiment of the invention shown on FIG. 6 provides switch control signals $S_3, S_4, S_5$ and $S_6$ in addition to the previously described switch control signals $S_1$ and $S_2$ represented by waveforms B and C on FIG. 4. As shown by the waveform D on FIG. 4, switch control signal $S_3$ is raised to the "1" level only during the portion $T_X$ of each vertical interval and is otherwise at the "0" level. As shown by the waveforms B, C and D on FIG. 7, switch control signals $S_4, S_5$ and $S_6$ are only raised to the "1" level during the successive periods $T_R, T_G$ and $T_B$, respectively, of each horizontal interval during the portions $T_X$ and $T_Y$ of each vertical interval. The switch control signals $S_4, S_5$ and $S_6$ are respectively applied to switching circuits 37R, 37G and 37B so as to selectively close the latter only when the respective switch control signal is raised to the "1" level. Thus, during portions $T_X$ and $T_Y$ of each vertical interval, switching circuits 37R, 37G and 37B are closed in succession for periods $T_R, T_G$ and $T_B$, respectively, of each horizontal or line interval.

The output of variable phase shifter 11 is shown to be connected to a first input "0" of a switching circuit 38 having its output connected directly to the demodulating signal input of demodulator 6 and, through the phase shifter 12, to the demodulating signal input of demodulator 7. The local oscillation signal $C_W$ is further applied to a fixed phase shifter 39 which delays the phase thereof by 90°, and the output of phase shifter 39 is applied to a second input "1" of switching circuit 38. Switching circuit 38 is controlled by switch control signal $S_3$ so as to remain in its normal or first state shown on FIG. 6 whenever switch control signal $S_3$ is at the "0" level, and to be changed-over to a second state in which input "1" is connected to the output of switching circuit 38 only when switch control switch $S_3$ rises to the "1" level during the portion $T_X$ of each vertical interval.

Moreover, in the color hue control circuit of FIG. 6, the phase control signal obtained at the output of sample-hold circuit 27 is applied to a first input "0" of a switching circuit 40 having its output connected to variable phase shifter 11 for controlling the latter, while a second input "1" of switching circuit 40 is connected to the movable tap of variable resistor 31 for receiving the reference signal level $E_H$ therefrom. Switching circuit 40 is controlled by switch control signal $S_2$ so as to remain in its normal or first state shown on FIG. 6 so long as switch control signal $S_2$ is at the "0" level, that is, during the portions $T_Y$ and $T_X$ of each vertical interval, and switching circuit 40 is changed-over to a second state in which its input "1" is connected to the output, when switch control signal $S_2$ rises to the "1" level during the concluding portion $T_Y$ of each vertical interval. Finally, a normally open switch 17a is associated with switching signal generating circuit 17' so that, when switch 17a is manually closed, all of the switch control signals $S_1$–$S_6$ will remain continuously at the "0" level.

DESCRIPTION OF OPERATION OF THE EMBODIMENT OF FIG. 6

Assuming that switch 17a is in its normal or open position so that switching signal generating circuit 17' can produce the several previously switch control signals $S_1$–$S_6$, it will be seen that, during the portion $T_V$ of each vertical interval, that is, during the scanning of the area $A_V$ of the screen, switching circuits 4Y,4C,38 and 40 are all in their normal or first states shown on FIG. 6, and switching circuits 34R,37G and 37B are all open. Thus, during the scanning of area $A_V$ of the screen, luminance component Y of the received composite color television signal is applied to matrix circuit 14 by way of switching circuit 4Y while the chrominance component of the received composite color television signal is applied through switching circuit 4C to demodulators 6 and 7. Further, during the portion $T_V$ of each vertical interval, the local oscillation signal $C_W$ is applied from oscillator 10 through variable phase shifter 11 and switching circuit 38 to the demodulating signal input of demodulator 6 and further through phase shifter 12 to the demodulating signal input of demodulator 7. It will also be seen that, during the portion $T_V$ of each vertical interval, the phase control signal from operational amplifier 30 of sample-hold circuit 27 is applied through switching circuit 40 to variable phase shifter 11 so that the latter delays the phase of the local oscillation signal applied thereto by more or less than 90° in dependence on variations of the phase control signal from circuit 27.

It will be apparent from the foregoing that, during the scanning of area $A_V$ of the screen, the color hue control circuit of FIG. 6 operates in substantially the same manner as the previously described circuit of FIG. 3 in that matrix circuit 14 receives demodulated color difference signals (R-Y),(B-Y) and (G-Y) from demodulators 6 and 7 and matrix circuit 13, respectively, for providing individual color signals R,G and B. When such individual color signals R,G and B are applied to the color picture tube, the resulting color picture displayed at the area $A_V$ of the screen has its hue determined only by the selected reference signal level $E_H$ in dependence on the adjustment of variable resistor 31. Even if the color modulated subcarrier of the received composite color television signal has phase distortions, the feedback of the demodulated chrominance reference portion of the VIR signals from the output of demodulator 6 to the input of sample-hold circuit 27 and the resulting change in the phase control signal applied from operational amplifier 30 of circuit 27 through switching circuit 40 to variable phase shifter 11 ensures that the phase distortions will be suitably corrected for maintaining the desired or selected hue of the color picture displayed at the area $A_V$.

During the portion $T_X$ of each vertical interval, that is, when the electron beams are scanning the bar-like area $A_X$ of the screen, switch control signals $S_1$ and $S_3$ are raised to the "1" level for changing-over switching circuits 4Y,4C and 38 to their second states in which the input "1" of each of such switching circuits is connected to the respective output, and switch control signals $S_4$,$S_5$ and $S_6$ are provided successively in a repeating cycle for successively closing switching circuits 37R,37G and 37B for the periods $T_R$,$T_G$ and $T_B$, respectively, of each horizontal interval. By reason of the foregoing, the standard luminance signal $E_Y$ is supplied from generating circuit 35 through switching circuit 4Y to matrix circuit 14, and the signals $C_R$,$C_G$ and $C_B$ having phases corresponding to the R-Y, G-Y and B-Y axes, respectively, are applied successively during the periods $T_R$,$T_G$ and $T_B$ of each horizontal or line interval through switching circuits 37R,37G and 37B, respectively, and then through switching circuit 4C to demodulators 6 and 7. The local oscillation signal $C_W$ delayed by 90° by fixed phase shifter 39 is applied through switching circuit 38 to demodulator 6 as a demodulating signal on the R-Y axis, and is applied from switching circuit 38 through phase shifter 12 to demodulator 7 as a demodulating signal on the B-Y axis. As a result of the foregoing, standard color difference signals ($E_R$-$E_Y$), ($E_G$-$E_Y$) and ($E_B$-$E_Y$) varying as shown by waveforms, B,C and D, respectively, on FIG. 5 are applied to matrix circuit 14 from demodulator 6, matrix circuit 13 and demodulator 7 so that matrix circuit 14 provides standard color signals $E_R$,$E_G$ and $E_B$ substantially as shown by the waveforms E, F and G, respectively, on FIG. 5. Such standard color signals $E_R$,$E_G$ and $E_B$, when applied to the color picture tube, cause the latter to display the standard red, green and blue colors in the horizontally successive areas $X_R$,$X_B$ and $X_B$, respectively, of the standard color bar $A_X$ (FIG. 1).

During the concluding portion $T_Y$ of each vertical interval, that is, during the scanning of bar-like area $A_Y$ on the screen, switch control signal $S_1$ remains at the "1"level and switch control signals $S_4$,$S_5$ and $S_6$ are produced during the successive periods $T_R$,$T_G$ and $T_B$, respectively, of each horizontal or line interval, as previously described. However, switch control signal $S_2$ is raised to the "1" level so that switching circuit 40 is changed-over to its second state for applying the reference signal level $E_H$ from the movable tap of variable resistor 31 to variable phase shifter 11 as a phase control signal for the latter. Further, switch control signal $S_3$ is returned to its "0" level for restoring switching circuit 38 to its normal or first state shown on FIG. 6, and in which the demodulating signals for demodulators 6 and 7 have their phases controlled by variable phase shifter 11. As a result of the foregoing, during the portion $T_Y$ of each vertical interval, matrix circuit 14 receives the luminance signal $E_Y$ from generating circuit 35 and reference color difference signals ($E'_R$-$E'_Y$), ($E'_G$-$E'_Y$) and ($E'_B$-$E'_Y$) from demodulator 6, matrix circuit 13 and demodulator 7, respectively, so as to provide therefrom individual reference color signals $E'_R$,$E'_G$ and $E'_B$. It will be understood that, when reference signal level $E_H$ is equal to the standard level $E_{HO}$, variable phase shifter 11 delays the phase of the local oscillating signal $C_W$ by 90° so that the reference color difference signals ($E'_R$-$E'_Y$), ($E'_G$-$E'_Y$) and ($E'_B$-$E'_Y$) are respectively equal to the standard color difference signals ($E_R$-$E_Y$),($E_G$-$E_Y$) and ($E_B$-$E_Y$). However, adjusting variable resistor 31 to make the reference signal level $E_H$ greater or less than the standard level $E_{HO}$, will cause phase shifter 11 to suitably vary the delay of the local oscillating signal $C_W$, and thereby vary the relation of signals $(E'_R-E'_Y)$, $(E'_G-E'_Y)$ and $(E'_B-E'_Y)$ to each other. Thus, the individual reference color signals $E'_R, E'_G$ and $E'_B$, when applied to the color picture tube, cause the latter to display red, green and blue colors in the horizontally successive areas $Y_R, Y_G$ and $Y_B$, respectively, of the reference color bar $A_Y$ on the screen, with the hues of such colors being dependent upon the reference signal level $E_H$ and indicating the hue of the color picture being displayed at the area $A_V$, as previously described with reference to the embodiment of FIG. 3.

Figure 8:
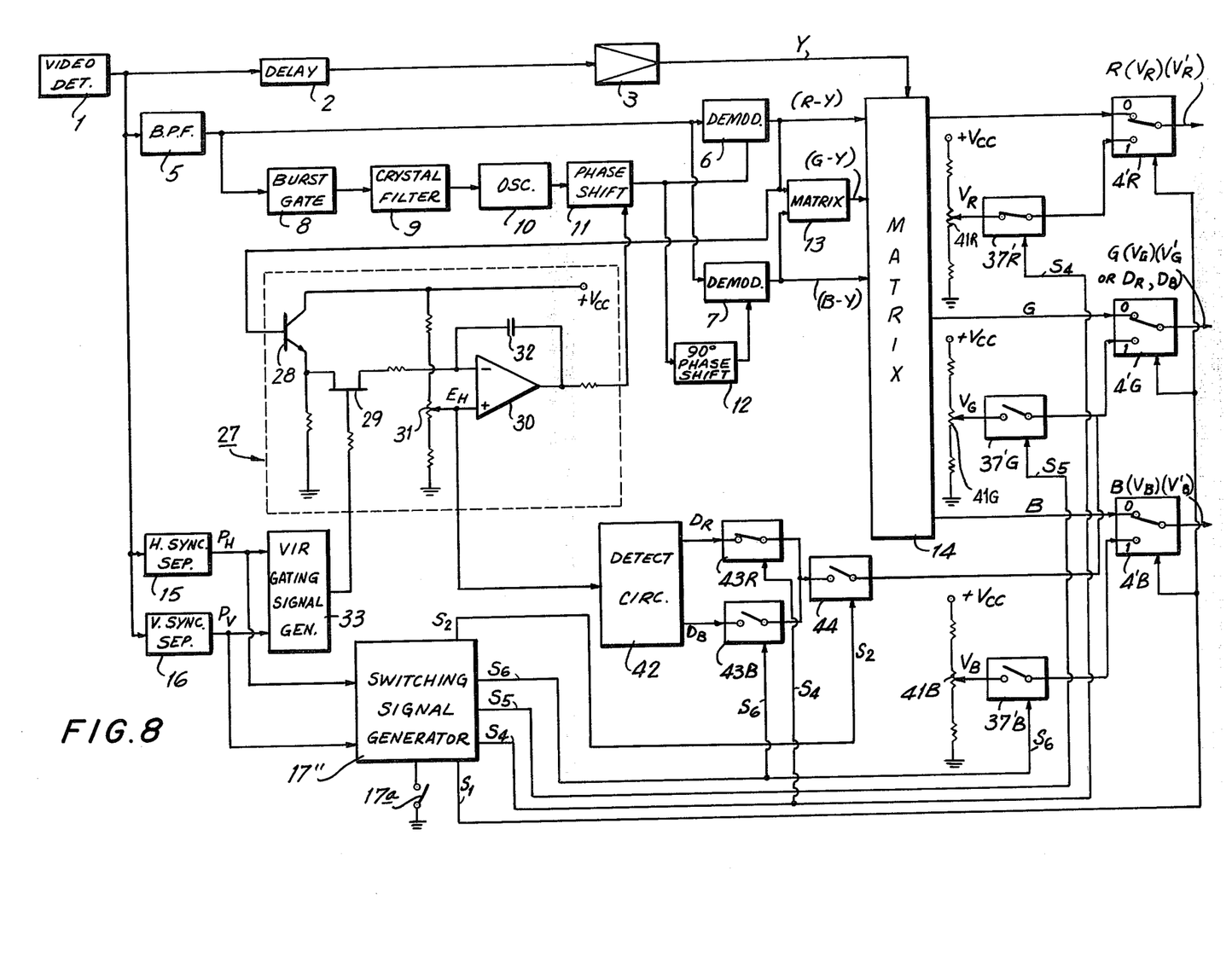
FIG. 8 is a block diagram illustrating a color hue control circuit according to still another embodiment of this invention.

Still another embodiment of the invention is shown on FIG. 8 in which the components of the illustrated color hue control circuit corresponding to those previously described are identified by the same reference numerals. The color hue control circuit of FIG. 8 differs from those previously described with reference to FIGS. 3 and 6 primarily in that only the luminance component Y of the received composite color television signal and the color difference signals (R-Y), (G-Y) and (B-Y) demodulated from the chrominance component of the received signal are applied to the matrix circuit 14 for providing the individual color signals R, G and B which, when applied to the color picture tube, cause the latter to display a corresponding color picture at the area $A_V$ of the screen. Once again, the hue of such displayed color picture is determined or selected by adjustment of the variable resistor 31, and the sample-hold circuit 27 is operative to maintain the selected hue even when the color modulated subcarrier of the received composite color television signal has phase distortions.

More particularly, in the color hue control circuit of FIG. 8, the individual color signals R, G and B from matrix circuit 14 are applied to first inputs "0" of switching circuits 4′R, 4′G and 4′B, respectively, which have their outputs connected to respective cathodes of the color picture tube (not shown). The switching circuits 4′R, 4′G and 4′B are controlled by the switch control signal $S_1$ (waveform B on FIG. 4) from a switching signal generating ciruit 17″, and have respective second inputs "1" which are respectively connected through normally open switching circuits 37′R, 37′G and 37′B to movable contacts of variable resistors 41R, 41G and 41B, respectively. The variable resistors 41R, 41G and 41B are connected between a voltage source $+V_{cc}$ and ground to provide selected DC voltages $V_R, V_G$ and $V_B$, respectively, at their movable taps.

The switching circuits 4′R, 4′G and 4′B are maintained in their illustrated normal or first states for supplying the individual color signals R, G and B from matrix circuit 14 to the color picture tube so long as switch control signal $S_1$ is at its "0" level, and switching circuits 4′R, 4′G and 4′B are changed-over to their second states, in which their inputs "1" are connected to the respective outputs only when switch control signal $S_1$ is raised to the "1" level during the portions $T_X$ and $T_Y$ of each vertical interval. The switching circuits 37′R, 37′G and 37′B are respectively controlled by switch control signals $S_4, S_5$ and $S_6$ from switching signal generating circuit 17″ so as to be closed only when the respective switch control signal is at its "1" level. The switch control signals $S_4, S_5$ and $S_6$ are as represented by waveforms B, C and D, respectively, on FIG. 7 so that switches 37′R, 37′G and 37′B are successively closed in a repeating cycle during the successive periods $T_R, T_G$ and $T_B$ of each horizontal or line interval during the portions $T_X$ and $T_Y$ of each vertical interval.

It will further be seen that, in the color hue control circuit of FIG. 8, the reference signal level $E_H$ selectively provided at the movable tap of variable resistor 31 is applied to a detecting circuit 42 having two outputs $D_R$ and $D_B$ connected by normally open switching circuits 43R and 43B, respectively, in parallel, to the input of a normally open switching circuit 44 which has its output connected to the input "1" of switching circuit 4′G. The switching circuits 43R and 43B are respectively controlled by the switch control signals $S_4$ and $S_6$ so as to be closed only during the periods $T_R$ and $T_B$, respectively, of each horizontal or line interval during portions $T_X$ and $T_Y$ of each vertical interval, and switching circuit 44 is controlled by switch control signal $S_2$ from switching signal generating circuit 17″ so as to be closed only when switch control signal $S_2$ is raised to the "1" during the portion $T_Y$ of each vertical interval, as indicated by the waveforms C on FIG. 4.

The detecting circuit 42 is suitably designed so that its output $D_R$ and $D_B$ will indicate the relation of the reference signal level $E_H$ to the standard or optimum level $E_{HO}$. More particularly, when the reference signal level $E_H$ is equal to the standard or optimum level $E_{HO}$ so that the hue of the color picture displayed at area $A_V$ of the screen will be the predetermined optimum or standard hue, both outputs $D_R$ and $D_B$ of the detecting circuit 42 are zero. On the other hand, when variable resistor 31 is adjusted so that reference signal level $E_H$ is smaller than the optimum or standard level $E_{HO}$ and thereby provides the color picture displayed at area $A_V$ with a hue which is more strongly red than the optimum or standard view, the output $D_B$ of detecting circuit 42 remains zero and the output $D_R$ becomes a positive voltage which is suitably proportional to the amount by which the reference signal level $E_H$ is lower than the standard or optimum level $E_{HO}$. Conversely, when variable resistor 31 is adjusted to make the reference signal level $E_H$ larger than optimum or standard level $E_{HO}$ and thereby provide the color picture displayed at area $A_V$ with a hue that is more strongly blue than the standard or optimum hue, the output $D_R$ of detecting circuit 42 is zero and the output $D_B$ becomes a positive voltage which is proportional to the amount by which reference signal level $E_H$ is larger than the standard level $E_{HO}$.

DESCRIPTION OF OPERATION OF THE EMBODIMENT OF FIG. 8

Assuming that switch 17a associated with switching signal generating circuit 17″ is in its normal or open position so that circuit 17″ provides switch control signals $S_1, S_2, S_4 S_5$ and $S_6$, it will be apparent that, during the scanning of area $A_V$ on the screen, the individual color signals R, G and B from matrix circuit 14 are passed through switching circuits 4′R, 4′G and 4′B to the color picture tube so as to display a color picture at area $A_V$ which corresponds to the received composite color television signal, with the hue of such color picture being determined by the reference signal level $E_H$, and being maintained continuously by circuit 27 even though the color modulated subcarrier of the received signal may have phase distortions.

During the portion T of each vertical interval that is, during the scanning of the bar-like area $A_X$, switch control signal $S_1$ rises to the level "1" for changing-over switching circuit 4′R, 4′G and 4′B to the second states of the latter, while switch control signal $S_2$ remains at the "0" level to maintain switching circuit 44 in its open state or condition. During the successive periods $T_R, T_G$ and $T_B$ of each horizontal or line interval of portion $T_X$ of each vertical, switching circuits 37'R, 37'G and 37'B are respectively closed in succession. Thus, the voltages $V_R$, $V_G$ and $V_B$ are applied during the periods $T_R$, $T_G$ and $T_B$, respectively, through switching circuits 4'R, 4'G and 4'B to the respective cathodes of the color picture tube as standard color signals for the latter. Accordingly, during the scanning of bar-like area $A_X$, standard red, green and blue colors are displayed in the horizontally successive areas $X_R$, $X_G$ and $X_B$ to form the standard color bar.

During the concluding portion $T_Y$ of each vertical interval, that is, during the scanning of bar-like area $A_Y$, switch control signal $S_2$ rises to the "1" level for closing switching circuit 44, while switch control signal $S_1$ remains at the "1" level and switch control signals $S_4$, $S_5$ and $S_6$ continue to be produced successively in the periods $T_R$, $T_G$ and $T_B$, respectively, of each horizontal or line interval. By reason of the foregoing, during each period $T_R$, switching circuits 37'R and 43R are simultaneously closes so that the voltage $V_R$ is applied through switching circuit 4'R to the cathode for the "red" beam of the color picture tube, while the output $D_R$ of detecting circuit 42 is simultaneously applied through switching circuit 4'G to the cathode for the "green" beam. During each period $T_G$, switching circuit 37'G is closed sothat the voltage $V_G$ is applied through switching circuit 4'G to the cathode for the "green" beam. Finally, during each period $T_B$, switching circuits 37'B and 43B are simultaneously closed so that the voltage $V_B$ is applied through switching circuit 4'B to the cathode for the "blue" beam while the output $D_B$ of detecting circuit 42 is simultaneously applied through switching circuit 4'G to the cathode for the "green" beam.

It will be apparent from the above, that, if the reference signal level $E_H$ is adjusted to be equal to the standard level $E_{HO}$ so as to provide the color picture displayed at area $A_V$ with the standard hue, in which case the outputs $D_R$ and $R_B$ of detecting circuit 42 are both zero, the reference color signals $V'_R$, $V'_G$ and $V'_B$ appearing at the outputs of switching circuits 4'R, 4'G and 4'B in succession are equal to the standard color signals $V_R$, $V_G$ and $V_B$, respectively, with the result that the red, green and blue colors displayed at areas $Y_R$, $Y_G$ and $Y_B$ of reference color bar $A_Y$ are equal to the standard red, green and blue colors, respectively, of standard color bar $A_X$.

However, signal level $E_H$ that is smaller or larger than the standard level $E_{HO}$, and thereby to provide the displayed color picture with a hue that is "redder" or "bluer", respectively, than the standard hue, either the positive voltage of output $D_R$ from detecting circuit 42 or the positive voltage of output $D_B$, respectively, is employed for also modulating the "green" electron beam of the color picture tube during the period $T_R$ or the period $T_B$, respectively, of each horizontal interval. In view of the foregoing, either the color displayed in the area $Y_R$ is determined by the simultaneous modulation of the "red" and "green" electron beams, or the color displayed in the area $Y_B$ is determined by the simultaneous modulation of the "blue" and "green" electron beams, with the result that the reference color bar $A_Y$, when compared with the adjacent standard color bar $A_X$, suitably indicates the nature of the deviation of the adjustably selected hue from the standard hue.

It will be apparent from the above description of color hue control circuits according to this invention that, in each case, the hue of the displayed color picture can be selectively adjusted by manipulation of the variable resistor 31 so as to either correspond to the standard hue or to deviate from the latter for satisfying the personal preference of the viewer; the selected hue is, at all times, maintained even though the color modulated subcarrier of the received composite color television signal may have phase distortions; and the selected hue of the displayed color picture can be readily determined merely by a visual comparison of the colors displayed at areas $Y_R$, $Y_G$ and $Y_B$ of the reference color bar $A_Y$ with the standard primary colors displayed at areas $X_R$, $X_G$ and $X_B$, respectively, of the standard color bar $A_X$.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a color television receiver having a color picture tube with a screen for displaying a color picture in response to the reception of a composite color television signal including a luminance component, a chrominance component constituted by color signals modulating a subcarrier, color burst signals, horizontal and vertical synchronizing signals and a phase reference signal inserted in a predetermined line interval of each vertical retrace interval of the composite color television signal: the combination of means for generating variable reference color signals; means for causing said color picture tube to display, on at least a portion of said screen thereof, areas of respective colors corresponding to said variable reference color signals; demodulating circuit means for demodulating said phase reference signal and said chrominance component so as to obtain demodulated color signals from the latter; means responsive to the demodulated phase reference signal for correcting errors in the hue of the color picture displayed on said screen in corresponding to the demodulated color signals due to phase distortions in said chrominance component of the received color television signal; and manually actuable hue adjusting means for simultaneously and correspondingly varying the relation of said demodulated color signals to each other and of said variable reference color signals to each other so that the hue of said areas of colors displayed on said screen will correspond to the hue of the color picture displayed on said screen.

2. A color television receiver according to claim 1; further comprising means for generating fixed standard color signals having a relation to each other representing a predetermined standard hue; and means for causing said color picture tube to display, on a second portion of said screen adjacent the first mentioned portion of the screen on which are displayed said areas of colors corresponding to said variable reference color signals, areas of primary colors corresponding to said standard color signals so that the relation of the hue of the displayed color picture to said standard hue can be readily determined by visual comparison of said areas of colors on said first portion of the screen with said areas of primary colors on said second portion of the screen.

3. A color television receiver according to claim 2; further comprising switching means for selectively applying said demodulated color signals, said standard color signals and said reference color signals to said color picture tube; and switching signal generating means responsive to said synchronizing signals for producing switch control signals by which said switching means are made to apply said demodulated color signals, said standard color signals and said reference color signals to said color picture tube in succession during respective portions of each vertical interval of the received color television signal.

4. A color television receiver according to claim 3; further comprising means for deactivating said switching signal generating means so that said switching means then applies said demodulated color signals to said color picture tube for the full period of each said vertical interval.

5. A color television receiver according to claim 1; in which said phase reference signal is the chrominance reference portion of a VIR signal.

6. A color television receiver according to claim 5; in which said chrominance reference portion of the VIR signal is in a predetermined alignment with the axis of one of said color signals modulating the subcarrier; said demodulating circuit means includes a plurality of synchronous detectors for receiving said chrominance component, and oscillator means responsive to said color burst signals to provide a local oscillation signal at the frequency of said subcarrier for application to said synchronous detectors as detecting signals with respective phases so as to cause said synchronous detectors to demodulate respective color signals of said chrominance component; and said means for correcting errors in the hue of the displayed color picture includes sample and hold circuit means connected with the output of the one of said synchronous detectors which demodulates said one color signal and being made operative during said predetermined line interval of each vertical retrace interval to sample and hold a signal level determined by the demodulated chrominance reference portion of said VIR signal and to provide a phase control signal in dependence on the relation of the sampled level to a reference signal level, and variable phase shifting means controllable by said phase control signal for correspondingly shifting the phases of said local oscillation signal as applied as detecting signals to said synchronous detectors.

7. A color television receiver according to claim 6; in which said hue adjusting means includes a manually actuable element for varying said reference signal level.

8. A color television receiver according to claim 7; in which said means for generating the reference color signals includes means receiving said reference signal level for determining the relation of said reference color signals in correspondence to said reference signal level.

9. A color television receiver according to claim 8; further comprising means for generating fixed standard color signals having a relation to each other representing a predetermined standard hue; and means for causing said color picture tube to display, on a second portion of said screen adjacent the first mentioned portion of the screen, areas of primary colors corresponding to said standard color signals so that the relation of the hue of the displayed color picture to said standard hue can be readily determined by visual comparison of said areas of colors on said first portion of the screen with the respective areas of primary colors on said second portion of the screen.

10. A color television receiver according to claim 9; further comprising switching means for selectively applying said demodulated color signals, said standard color signals and said reference color signals to said color picture tube; and switching signal generating means responsive to said synchronizing signals for producing switch control signals by which said switching means are made to apply said demodulated color signals, said standard color signals and said reference color signals to said color picture tube in succession during respective first, second and third portions of each vertical interval of the received color television signal.

11. A color television receiver according to claim 10; further comprising means for deactivating said switching signal generating means so that said switching means then applies said demodulated color signals to said color picture tube for the full period of each said vertical interval.

12. A color television receiver according to claim 10; in which said switch control signals include a first switch control signal produced during said second and third portions of each vertical interval and a second switch control signal produced during said third portion of each vertical interval; and said switching means includes first switching means having a first state in which said demodulated color signals are applied to said color picture tube and a second state to which said first switching means is changed-over in response to said first switch control signal, and second switching means having a first state in which said standard color signals are applied to said color picture tube through said first switching means in said second state of the latter, said second switching means having a second state to which the latter is changed-over in response to said second switch control signal for applying said reference color signals to the color picture tube through said first switching means in said second state of the latter.

13. A color television receiver according to claim 10; in which said means for generating said fixed standard color signals is operative to provide the latter successively in a repeating cycle during each horizontal interval of said second and third portions of each vertical interval; and said means for generating the reference color signals includes variable gain means receiving said standard color signals and being operative to selectively vary the relative levels thereof under the control of said reference level signal for providing said reference color signals from said standard color signals.

14. A color television receiver according to claim 13; in which said means for generating the standard color signals includes fixed gain amplifying means for the latter, and said variable gain means includes variable gain amplifying means; and in which said switch control signals include a first switch control signal produced during said second and third portions of each vertical interval and a second switch control signal produced during said third portion of each vertical interval; and said switching means includes first switching means having a first state in which said demodulated color signals are applied to said color picture tube and a second state to which said first switching means are changed-over in response to said first switch control signal, and second switching means having a first state in which the standard color signals from said fixed again amplifying means are applied to the color picture tube through said first switching means in said second state of the latter, said second switching means being changed-over to a second state thereof in response to said second switch control signal for applying said reference color signals from said variable gain amplifying means to said color picture tube through said first switching means in said second state of the latter.

15. A color television receiver according to claim 10; in which said means for generating said fixed standard color signals includes means for successively phase shifting said local oscillation signal and applying the resulting successively phase shifted oscillation signals as the inputs to said synchronous detectors in a repeating cycle during each horizontal interval of said second and third portions of each vertical interval, and means operative during said second portion of each vertical interval to fixedly phase shift said local oscillation signal and apply the same as detecting signals to said synchronous detectors so that the latter demodulate said standard color signals from said successively phase-shifted oscillation signals then applied as said inputs to the synchronous detectors; and in which said means for generating the variable reference color signals includes means operative during said third portion of each vertical interval for applying the output of said variable phase shifting means to said synchronous detectors as the detecting signals therefor, and means for contolling said variable phase shifting means by said reference signal level during said third portion of each vertical interval so that said synchronous detectors then demodulate said reference color signals from said successively phase-shifted oscillation signals being applied as said inputs to the synchronous detectors.

16. A color television receiver according to claim 15; in which said switch control signals include a first switch control signal produced during said second and third portions of each vertical interval, a second switch control signal produced during said third portion of each vertical interval, a third switch control signal produced during said second portion of each vertical interval, and a repeating cycle is successive switch control signals produced during each horizontal interval of said second and third portions of each vertical interval; and said switching means includes first switching means having a first state in which said chrominance component is applied as the inputs to said synchronous detectors and being changed-over to a second state in response to said first switch control signal, second switching means having a first state in which said phase control signal is applied from said sample and hold circuit means to said variable phase shifting means and being changed-over to a second state in response to said second switch control signal for applying said reference signal level to said variable phase shifting means, third switching means having a first state in which the output of said variable phase shifting means is applied to said synchronous detectors as said detecting signals for the latter and being changed-over to a second state by said third switch control signal for applying the fixedly phase shifted local oscillation signal as the detecting signals for said synchronous detectors, and additional switching means closed successively in a repeating cycle in response to said repeating cycle of successive switch control signals for applying said successively phase shifted oscillation signals as the inputs to said synchronous detectors by way of said first switching means in said second state of the latter.

17. A color television receiver according to claim 10; in which said switch control signals include a first switch control signal produced during said second and third portions of each vertical interval, a second switch control signal produced during said third portion of each vertical interval, and a repeating cycle of successive switch control signals produced during each horizontal interval of said second and third portions of each vertical interval; said means for generating fixed standard color signals includes voltage sources providing potentials corresponding to the respective standard color signals; said means for generating the variable reference color signals includes means for detecting said reference signal level and providing correspondingly varied supplemental potentials; and said switching means includes first switching means for each color signal having a first state for applying the respective demodulated color signal to the color picture tube and being changed-over to a second state in response to said first switch control signal, normally open second switching means being changed-over to a closed state in response to said second switch control signal, normally open third switching means connected between each of said voltage sources and a respective one of said first switching means and being closed successively in a repeating cycle in response to said repeating cycle of successive switch control signals for applying said potentials corresponding to the respective standard color signals to the color picture tube through the respective first switching means in said second state of the latter, and normally open fourth switching means for each of said supplemental potentials being selectively closed in response to respective ones of said successive switch control signals for applying the respective supplemental potential to the color picture tube through said second switching means in the closed state of the latter and through the one of said first switching means associated with the third switching means which is unaffected by the successive switch control signals which cause closing of said fourth switch means.

* * * * *